United States Patent
Kim et al.

(10) Patent No.: US 11,437,642 B2
(45) Date of Patent: Sep. 6, 2022

(54) RECHARGEABLE BATTERY AND MODULE OF THE SAME

(71) Applicant: SAMSUNG SDI CO., LTD., Yongin-si (KR)

(72) Inventors: Joonghun Kim, Yongin-si (KR); Kangwook Kim, Yongin-si (KR); Backgun Kim, Yongin-si (KR); Wook Su Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 21 days.

(21) Appl. No.: 16/343,544

(22) PCT Filed: Oct. 18, 2017

(86) PCT No.: PCT/KR2017/011533
§ 371 (c)(1),
(2) Date: Apr. 19, 2019

(87) PCT Pub. No.: WO2018/074842
PCT Pub. Date: Apr. 26, 2018

(65) Prior Publication Data
US 2019/0319295 A1  Oct. 17, 2019

(30) Foreign Application Priority Data
Oct. 21, 2016  (KR) .................. 10-2016-0137736

(51) Int. Cl.
*H01M 10/04* (2006.01)
*H01M 50/172* (2021.01)
(Continued)

(52) U.S. Cl.
CPC ......... *H01M 10/04* (2013.01); *H01M 50/172* (2021.01); *H01M 50/531* (2021.01); *H01M 50/543* (2021.01)

(58) Field of Classification Search
CPC .... H01M 2/0217; H01M 2/0473; H01M 2/30; H01M 2/021; H01M 2/26; H01M 50/15;
(Continued)

(56) References Cited

U.S. PATENT DOCUMENTS

2009/0159311 A1* 6/2009 Zheng ............... H01M 10/6566
174/126.3
2012/0040218 A1  2/2012 Zheng
(Continued)

FOREIGN PATENT DOCUMENTS

CN  201466126 U  5/2010
CN  102656716 A  9/2012
(Continued)

OTHER PUBLICATIONS

Extended European Search Report dated May 20, 2020, of the corresponding European Patent Application No. 17863191.7.
(Continued)

*Primary Examiner* — Stewart A Fraser
*Assistant Examiner* — Lilia Nedialkova
(74) *Attorney, Agent, or Firm* — Lee IP Law, P.C.

(57) ABSTRACT

An exemplary embodiment of the present invention provides a rechargeable battery, including: an electrode assembly formed by disposing an electrode having coated regions and uncoated tabs at opposite sides of a separator; a case configured to accommodate the electrode assembly therein; a cap plate coupled to an opening of the case; and electrode terminals insert-molded into terminal holes of the cap plate to be connected to the uncoated tabs, wherein the electrode terminal includes: an external terminal portion configured to protrude outside of the cap plate; an internal terminal portion disposed within the cap plate to be connected to the uncoated tabs; and a connector configured to connect the external terminal portion and the internal terminal portion, and
(Continued)

disposed in the terminal hole to be insulated by a molding resin material.

16 Claims, 12 Drawing Sheets

(51) Int. Cl.
*H01M 50/531* (2021.01)
*H01M 50/543* (2021.01)

(58) Field of Classification Search
CPC ............ H01M 50/103; H01M 50/172; H01M 50/553; H01M 50/557; H01M 50/502; H01M 50/516; H01M 50/543; H01M 50/531; H01M 10/04
See application file for complete search history.

(56) References Cited

U.S. PATENT DOCUMENTS

| | | | |
|---|---|---|---|
| 2012/0115022 A1 | 5/2012 | Kado et al. | |
| 2012/0288748 A1 | 11/2012 | Oshima et al. | |
| 2013/0011724 A1 | 1/2013 | Kado | |
| 2013/0089773 A1 | 4/2013 | Kim et al. | |
| 2014/0147729 A1 | 5/2014 | Moon et al. | |
| 2014/0302381 A1* | 10/2014 | Song | H01M 2/30 429/158 |
| 2014/0308575 A1 | 10/2014 | Kim et al. | |
| 2014/0356700 A1 | 12/2014 | Song et al. | |
| 2015/0214516 A1 | 7/2015 | Jang et al. | |
| 2015/0364731 A1 | 12/2015 | Yoo et al. | |
| 2016/0099440 A1 | 4/2016 | Park et al. | |
| 2016/0099445 A1 | 4/2016 | Park et al. | |
| 2016/0248068 A1 | 8/2016 | Ha | |
| 2017/0207438 A1 | 7/2017 | Zhu et al. | |

FOREIGN PATENT DOCUMENTS

| | | |
|---|---|---|
| CN | 104810498 A | 7/2015 |
| CN | 205376656 U | 7/2016 |
| CN | 105914315 A | 8/2016 |
| EP | 2 899 770 A1 | 7/2015 |
| KR | 10-2006-0022357 A | 3/2006 |
| KR | 10-1067755 B1 | 9/2011 |
| KR | 10-2014-0066929 A | 6/2014 |
| KR | 10-2014-0124247 A | 10/2014 |
| KR | 10-2014-0139958 A | 12/2014 |
| KR | 10-2015-0144600 A | 12/2015 |
| KR | 10-2016-0042245 A | 4/2016 |
| KR | 10-2016-0042246 A | 4/2016 |
| WO | WO 2010/124556 A1 | 11/2010 |

OTHER PUBLICATIONS

International Search Report for PCT/KR2017/011533 filed Oct. 18, 2017.
Chinese Office Action dated Apr. 22, 2021, the accompanying Search Report dated Apr. 15, 2021, for corresponding Chinese Patent Application No. 201780065389.X.
European Office Action dated Apr. 29, 2021, for corresponding European Patent Application No. 17863191.7.
Notice of Allowance dated Sep. 27, 2021, of the corresponding Korean Patent Application No. 10-2016-0137736.
Chinese Office Action dated Jan. 10, 2022, for corresponding Chinese Patent Application No. 201780065389.X.
Chinese Office Action dated Jun. 22, 2022, for corresponding Chinese Patent Application No. 201780065389.X.

* cited by examiner

RECHARGEABLE BATTERY AND MODULE OF THE SAME

CROSS-REFERENCE TO THE RELATED APPLICATION

This is the U.S. national phase application based on PCT Application No. PCT/KR2017/011533, filed Oct. 18, 2017, which is based on Korean Patent Application No. 10-2016-0137736, filed Oct. 21, 2016, the entire contents of all of which are hereby incorporated by reference.

TECHNICAL FIELD

The present invention relates to a rechargeable battery and a module thereof, and more particularly, to a rechargeable battery and a module thereof, which connects a plurality of uncoated tabs drawn out from an electrode assembly to an electrode terminal.

BACKGROUND ART

A rechargeable battery can be repeatedly charged and discharged, unlike a primary battery. A low-capacity rechargeable battery is used for small portable electronic devices such as a mobile phone, a notebook computer, and a camcorder, and a large-capacity rechargeable battery is used as a power supply for driving a motor such as for a hybrid car.

For example, a rechargeable battery includes an electrode assembly for charging and discharging, a case accommodating the electrode assembly and an electrolyte solution, a cap plate coupled to an opening of the case, and an electrode terminal that is electrically connected to the electrode assembly to draw out the electrode assembly to the outside of the cap plate.

An uncoated tab of the electrode assembly is connected to a current collecting member, and the current collecting member is connected to the electrode terminal. The electrode terminal is formed by welding a rivet portion to the power collecting member at an inner side of the cap plate, drawing the rivet portion to the outside through a gasket inserted into a terminal hole of the cap plate, and coupling the plate terminal to the rivet portion from the outside of the cap plate.

As a result, a structure of the electrode terminal becomes complicated around the terminal hole of the cap plate, the number of constituent elements connecting the electrode terminal and the electrode assembly increases, and a space required for the constituent elements is increased. Such structures, constituent elements, and space requirements cause the weight of the rechargeable batteries to increase, manufacturing costs to increase, cell heights to increase, and space utilization to decrease.

DISCLOSURE

Technical Problem

An exemplary embodiment of the present invention has been made in an effort to provide a rechargeable battery which simplifies a structure of an electrode assembly around a terminal hole of a cap plate and reduces a number of constituent elements connecting an electrode assembly and an electrode terminal. An exemplary embodiment of the present invention has been made in an effort to provide a rechargeable battery, which reduces weight and manufacturing costs, reduces a cell height, and improves space utilization. An exemplary embodiment of the present invention has been made in an effort to provide a rechargeable battery module employing the rechargeable battery.

Technical Solution

An exemplary embodiment of the present invention provides a rechargeable battery including: an electrode assembly formed by disposing an electrode having coated regions and uncoated tabs at opposite sides of a separator; a case configured to accommodate the electrode assembly therein; a cap plate coupled to an opening of the case; and electrode terminals insert-molded into terminal holes of the cap plate to be connected to the uncoated tabs, wherein the electrode terminal includes: an external terminal portion configured to protrude outside of the cap plate; an internal terminal portion disposed within the cap plate to be connected to the uncoated tabs; and a connector configured to connect the external terminal portion and the internal terminal portion, and disposed in the terminal hole to be insulated by a molding resin material.

The terminal hole may be formed with a first gap in a width direction of the cap plate, and may be formed with a second gap that is larger than the first gap in a longitudinal direction that intersects the width direction to be spaced apart from the electrode terminal.

The electrode terminal may have a thickness that is smaller than the first gap in the width direction, and may have a width that is smaller than the second gap and larger than the thickness in the longitudinal direction.

The external terminal portion and the internal terminal portion may be formed of a same material or different materials.

The external terminal portion and the internal terminal portion may be separately formed, and the connector may be formed by stacking and welding the external terminal portion and the internal terminal portion in the width direction.

The external terminal portion and the internal terminal portion may have a same width in the longitudinal direction.

The external terminal portion and the internal terminal portion may have a same thickness t11 in the width direction.

The connector may be formed to have a total thickness (2×t11) of the external terminal portion and the internal terminal portion in the width direction.

The molding resin material may seal outer end portions of the external terminal portion and the internal terminal portion outside of the terminal hole, and may seal inner end portions of the external terminal portions and the internal terminal portion inside of the terminal hole.

The external terminal portion may have a first thickness t1 in the width direction, and the internal terminal portion may have a second thickness t2 that is thinner than the first thickness in the width direction.

The connector may be formed to have a total thickness (t1+t2) of the first thickness of the external terminal portion and the second thickness of the internal terminal portion in the width direction.

The external terminal portion and the internal terminal portion may be integrally formed, and the connector may form a step by the first thickness of the external terminal portion and the second thickness of the internal terminal portion, to extend in a height direction intersecting with a plane of the cap plate.

The molding resin material may seal the external terminal portion outside the terminal hole, may seal the internal terminal portion inside the terminal hole, and may seal the step within a thickness range of the cap plate.

The connector may further form a concave groove at an upper portion of the step.

The molding resin material may further seal the concave groove within a thickness range of the cap plate.

An exemplary embodiment of the present invention provides a rechargeable battery module, including at least a first cell and a second cell, each of which is formed of a rechargeable battery including an external terminal portion configured to protrude outside of a cap plate, an internal terminal portion disposed inside the cap plate to be connected to an electrode assembly, and a connector configured to connect the external terminal portion and the internal terminal portion and disposed in a terminal hole of the cap plate to be insulated by a molding resin material, and disposed in a width direction of the cap plate, wherein the external terminal portion of the first cell is laterally bent toward the second cell, and the external terminal portion of the second cell is bent toward an upper side of the external terminal portion of the first cell, to be welded to each other.

The terminal hole may be formed with a first gap in a width direction of the cap plate, and may be formed with a second gap that is larger than the first gap in a longitudinal direction that intersects the width direction to be spaced apart from the electrode terminal.

The external terminal portion of the first cell and the external terminal portion of the second cell may have a thickness that is smaller than the first gap in the width direction, and may have a width that is smaller than the second gap and larger than the thickness in the longitudinal direction.

Advantageous Effects

As such, according to the exemplary embodiments of the present invention, the internal terminal portion is connected to the electrode assembly, the external terminal portion is connected to the internal terminal by a connector to protrude to the outside of the cap plate, and the connector is insulated by the molding resin material. Accordingly, it is possible to simplify a structure of the electrode assembly around the terminal hole of the cap plate and to reduce a number of constituent elements connecting the electrode assembly and the electrode terminal. Therefore, the weight and manufacturing cost of the rechargeable battery may be reduced.

In addition, the rechargeable battery of the exemplary embodiment may reduce the space between the inner surface of the cap plate and the electrode assembly, thereby reducing the cell height and improving the space utilization rate. The rechargeable battery module of the exemplary embodiment is formed by bending and welding the external terminal portions of the first and second cells to electrically connect the external terminal portions to each other, and thus an additional bus bar for connecting the electrode terminals is not required. Accordingly, since the bus bar is not used, the total height of the module may be reduced.

Since the connector connecting the internal terminal portion and the external terminal portion is formed with a different thickness from the thickness of one side of the internal terminal portion and the external terminal portion and attached to the molding resin material filled in the terminal hole in a wide area, it is possible to provide strong resistance against an external force and impact that may be applied thereto.

MODE FOR INVENTION

Figure 1:
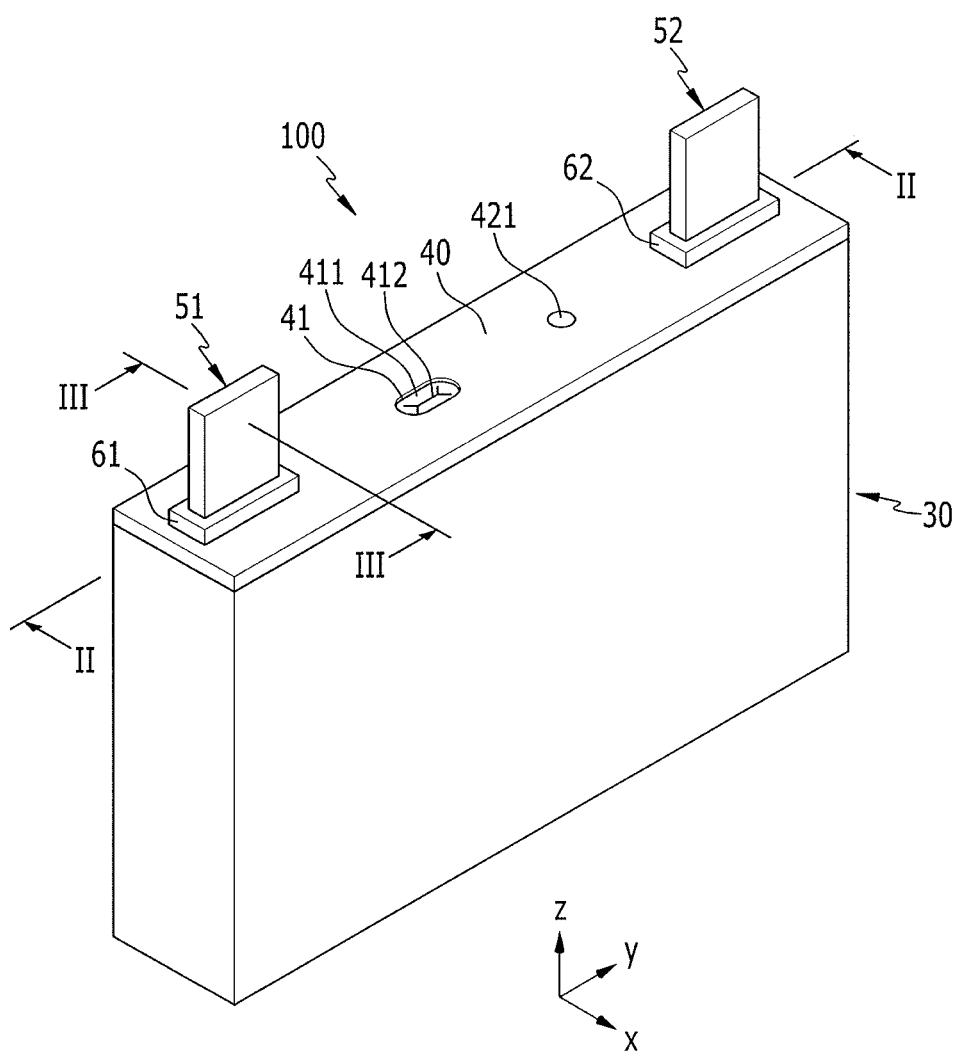
FIG. 1 illustrates a perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

Throughout this specification and the claims that follow, it will be understood that when an element such as a layer, film, region, or substrate is referred to as being "on" another element, it can be directly on the other element or intervening elements may also be present. Further, in the specification, the word "~on" or "~over" means positioning on or below the object portion, and does not necessarily mean positioning on the upper side of the object portion based on a gravity direction.

Figure 2:
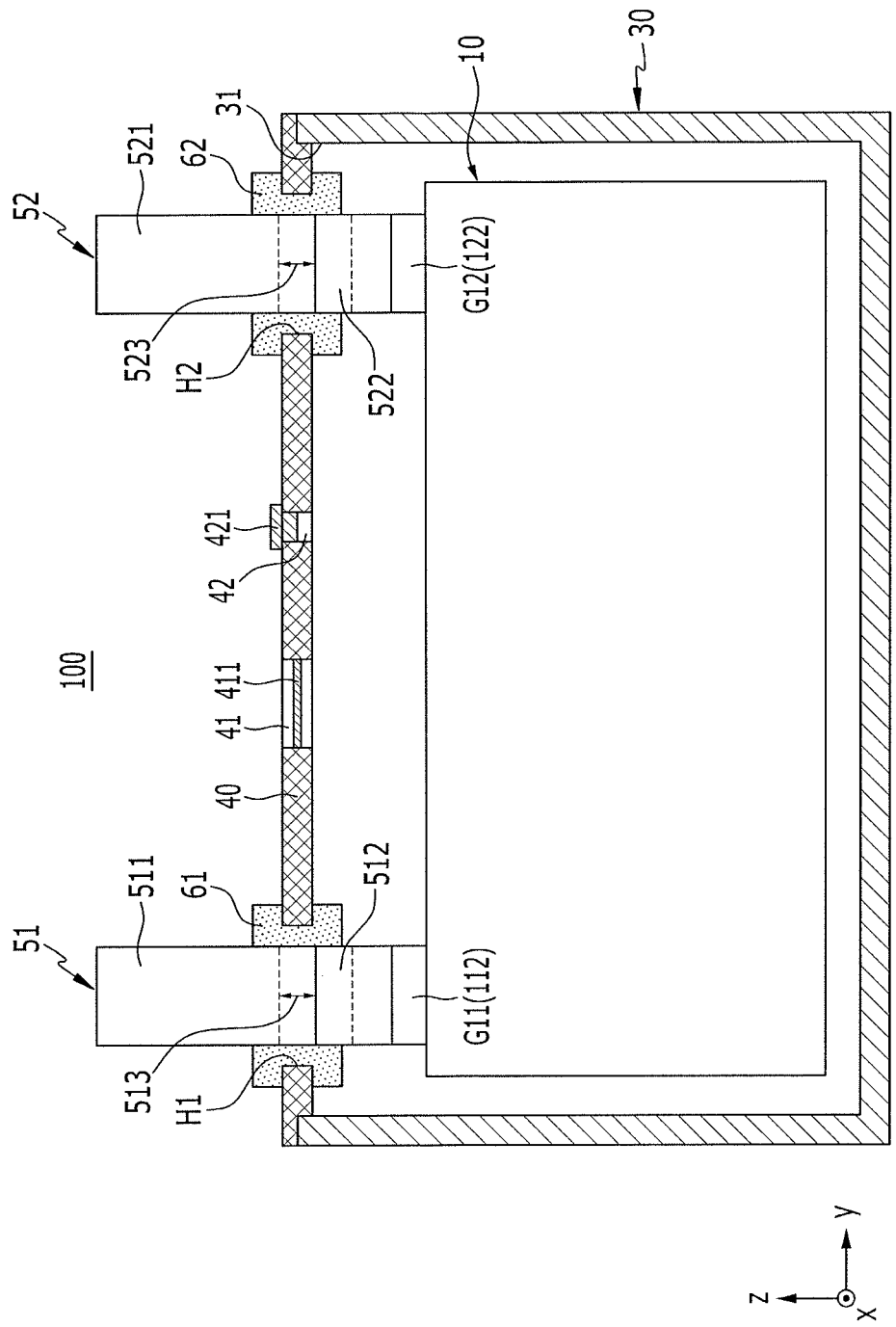
FIG. 2 illustrates a cross-sectional view taken along a line II-II of FIG. 1.
Figure 3:
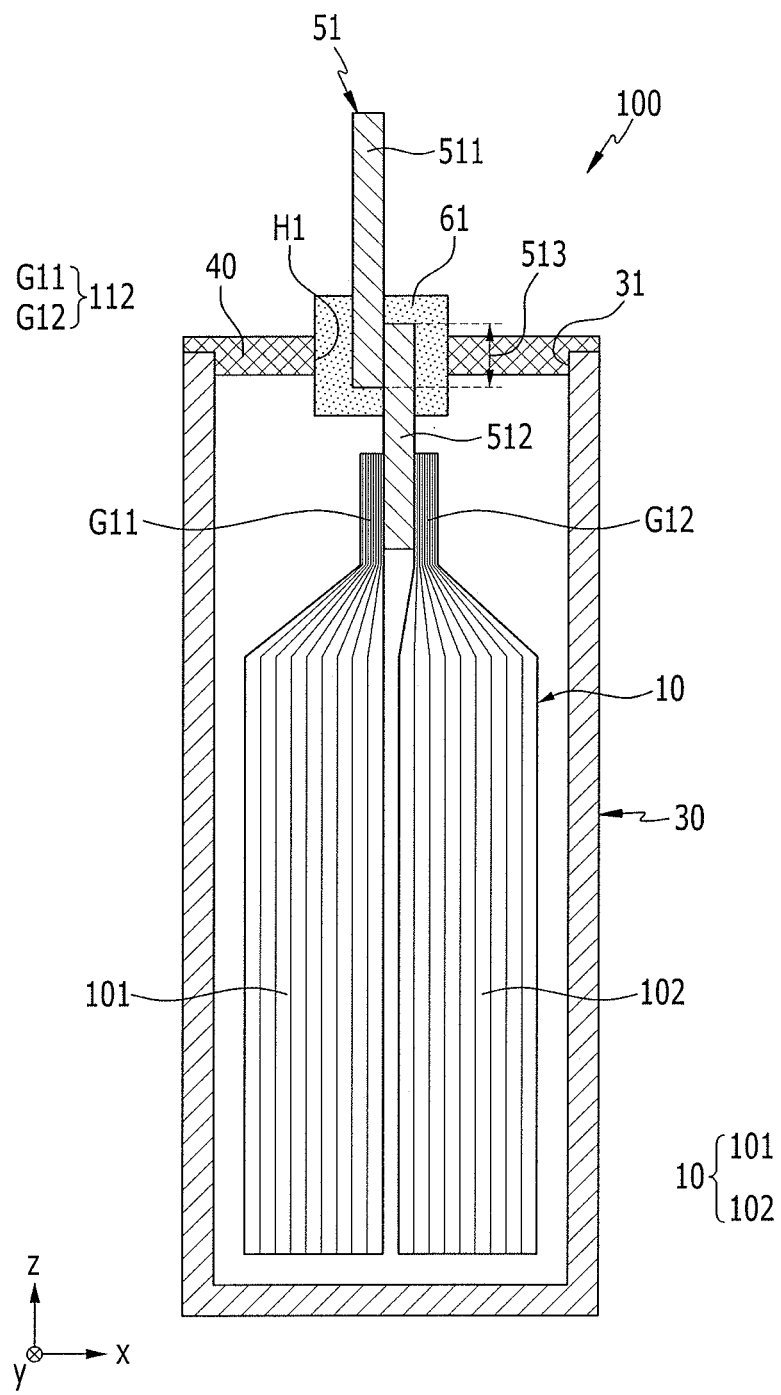
FIG. 3 illustrates a cross-sectional view taken along a line III-III of FIG. 1.

FIG. 1 illustrates a perspective view of a rechargeable battery according to a first exemplary embodiment of the present invention, FIG. 2 illustrates a cross-sectional view taken along a line II-II of FIG. 1, and FIG. 3 illustrates a cross-sectional view taken along a line III-III FIG. 1.

Referring to FIG. 1 to FIG. 3, the rechargeable battery 100 according to the first exemplary embodiment includes an electrode assembly 10 for charging and discharging a current, a case 30 for accommodating an electrode assembly 10 and an electrolyte solution therein, a cap plate 40 coupled to an opening 31 of the case 30 to close and seal the opening 31, and electrode terminals 51 and 52 electrically connected to the electrode assembly 10 to be installed in terminal holes H1 and H2 of the cap plate 40 by using an insert-molding method.

Although not illustrated, the rechargeable battery 100 may further include a top insulator formed of an electrically insulating material. The top insulator is disposed between an inner surface of the cap plate and the electrode assembly to electrically insulate the inner surface of the cap plate from the electrode assembly.

The case 30 sets a space for accommodating the plate-shaped electrode assembly 10 and the electrolyte solution. For example, the case 30 is formed to have a substantially cuboid shape, and has the opening 31 of a quadrangle shape at one side thereof for inserting the electrode assembly 10 therein. For example, the case 30 and the cap plate 40 may be formed of aluminum, and are thus coupled at the opening 31 to be welded to each other.

The cap plate 40 further includes a vent hole 41 and an electrolyte injection opening 42 in addition to the terminal holes H1 and H2. The vent hole 41 is closed and sealed by a vent plate 411 to discharge internal pressure thereof caused by a gas generated in the rechargeable battery 100 by the charging and discharging action of the electrode assembly 10. The vent plate 411 includes a notch 412 for guiding an incision thereof.

The electrolyte injection opening 42 facilitates injection of the electrolyte solution into the cap plate 40 and the case 30 after welding the cap plate 40 to the case 30. After injecting the electrolyte solution, the electrolyte injection opening 42 may be sealed with a sealing stopper 421.

Figure 4:
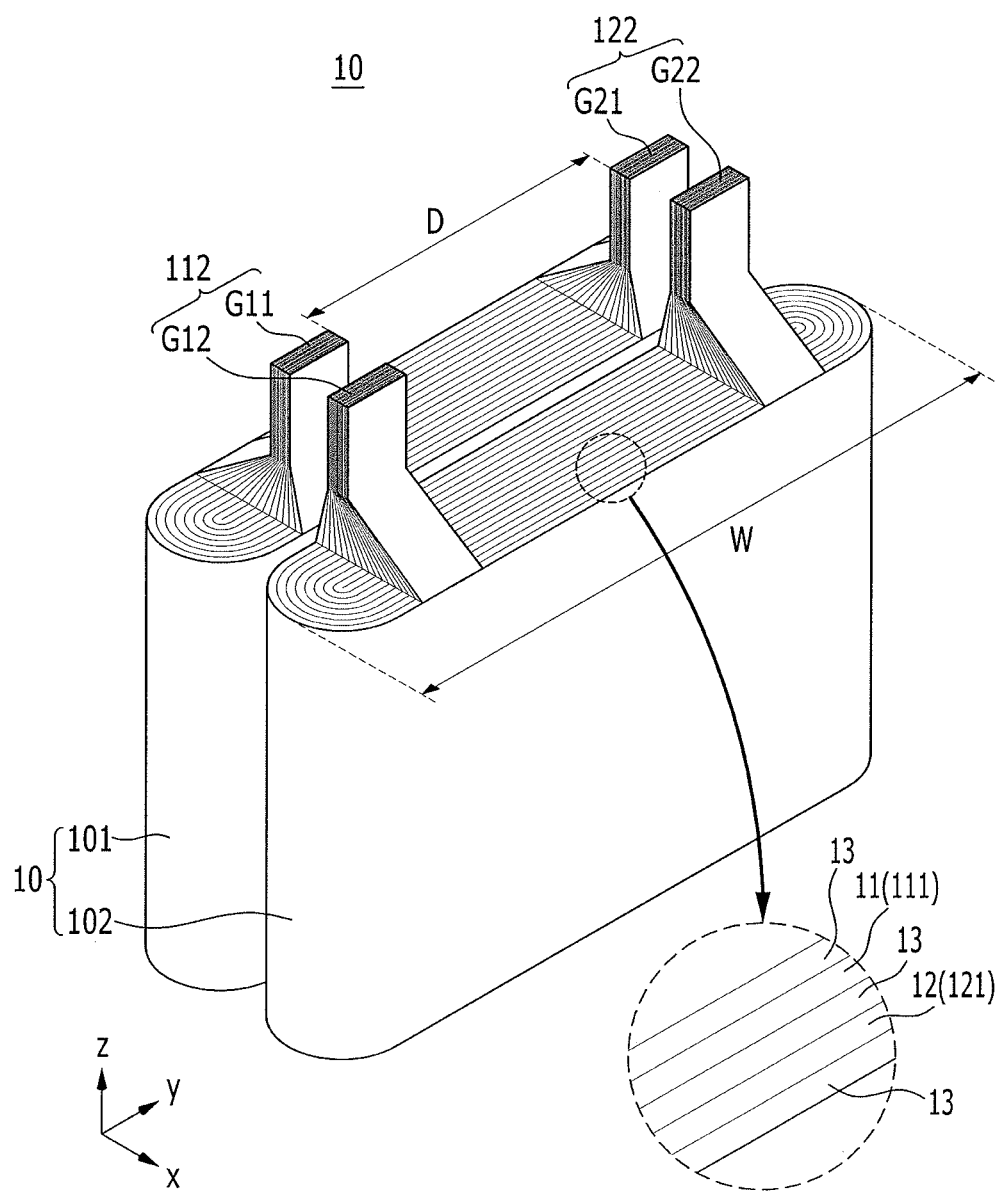
FIG. 4 illustrates a perspective view of an electrode assembly applied to FIG. 3.

FIG. 4 is a perspective view of an electrode assembly applied to FIG. 3. Referring to FIG. 2 to FIG. 4, the electrode assembly 10 is formed by disposing a first electrode (e.g., a negative electrode) 11 and a second electrode (e.g., a positive electrode) 12 at opposite sides of a separator 13, which is formed of an electrically insulating material.

As an example, the negative electrode 11, the separator 13, and the positive electrode 12 may be spiral-wound. Although not illustrated, the negative electrode 11, the separator 13, and the positive electrode 12 may be stacked to constitute an electrode assembly.

The negative and positive electrodes 11 and 12 respectively include coated regions 111 and 121 formed by coating an active material on a current collector made of a metal foil (e.g., a Cu or Al foil), and uncoated tabs 112 and 122 formed as current collectors that are exposed without coating the active material.

The uncoated tabs 112 and 122 are disposed at one end of the spiral-would electrode assembly 10, and are disposed at a distance D within one winding range W of the electrode assembly 10 from each other.

Specifically, the uncoated tabs 112 of the negative electrode 11 are disposed at one side (left side in FIG. 4) of the one end (upper end in FIG. 4) of the spiral-wound electrode assembly 10, and the uncoated tabs 122 of the positive electrode 12 are disposed at the other side (right side in FIG. 4) at a distance D from each other at the same end (upper end in FIG. 4) of the spiral-wound electrode assembly 10.

Total resistance of the uncoated tabs 112 and 122 is reduced since the uncoated tabs 112 and 122 are provided one by one in each winding cycle of the electrode assembly 10 to allow charge and discharge currents to flow therein. Accordingly, the electrode assembly 10 may charge and discharge high currents through the uncoated tabs 112 and 122.

In the first exemplary embodiment, the electrode assembly 10 is formed to include two assemblies. Although not illustrated, the electrode assembly may be formed to include one, three, or four electrode assemblies. That is, the electrode assembly 10 includes a first assembly 101 and a second assembly 102 disposed in a width direction (x-axis direction) of the cap plate 40.

In addition, the first and second assemblies 101 and 102 may be formed to have a plate shape in which opposite sides in a y-axis direction have a semicircular shape, so as to be accommodated in the case 30 having a substantially cuboid shape.

Figure 5:
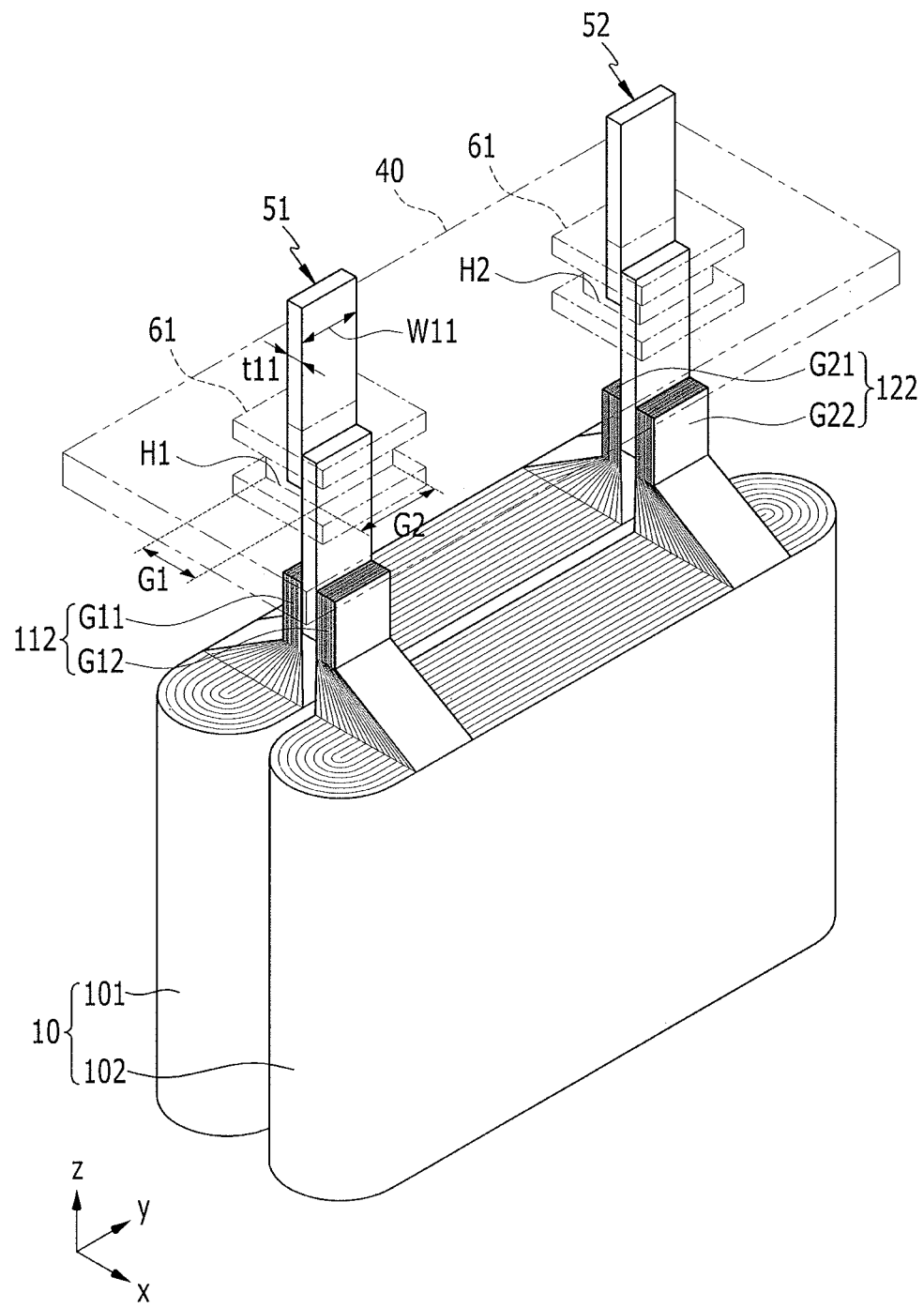
FIG. 5 illustrates a perspective view of the electrode assembly of FIG. 4 to which an electrode terminal is connected.

FIG. 5 illustrates a perspective view of the electrode assembly of FIG. 4 to which an electrode terminal is connected. Referring to FIG. 3 to FIG. 5, the first and second assemblies 101 and 102 of the electrode assembly 10 are disposed side by side to be electrically connected in parallel.

The electrode terminals 51 and 52 are respectively installed in the terminal holes H1 and H2 of the cap plate 40 by the insert-molding method. The electrode terminals 51 and 52 are electrically connected to the uncoated tabs 112 and 122, respectively, while being electrically insulated from the cap plate 40 by molding resin materials 61 and 62 (see FIG. 1 to FIG. 3 and FIG. 5). That is, the uncoated tabs 112 and 122 connect the first and second assemblies 101 and 102 to the electrode terminals 51 and 52.

As an example, the uncoated tabs 112 and 122 may be formed in a plurality of groups. The uncoated tabs 112 and 122 are disposing the electrode terminals 51 and 52 therebetween in the width direction (x-axis direction) of the cap plate 40 and bonded to sides of the electrode terminals 51 and 52 by forming areas that are set in a direction of extending a plane (yz plane) of the electrode assembly 10. In this case, the electrode terminals 51 and 52 form areas corresponding to the areas of the uncoated tabs 112 and 122 to be plane-bonded to the uncoated tabs 112 and 122.

In the first exemplary embodiment, the uncoated tabs 112 and 122 include first tab groups G11 and G21 and second tab groups G12 and G22, respectively. The first tab groups G11 and G21 are respectively connected to the negative and positive electrodes 11 and 12 of the first assembly 101 to be connected to the electrode terminals 51 and 52, and the second tab groups G12 and G22 are respectively connected to the negative and positive electrodes 11 and 12 of the second assembly 102 to be connected to the electrode terminals 51 and 52.

Figure 6:
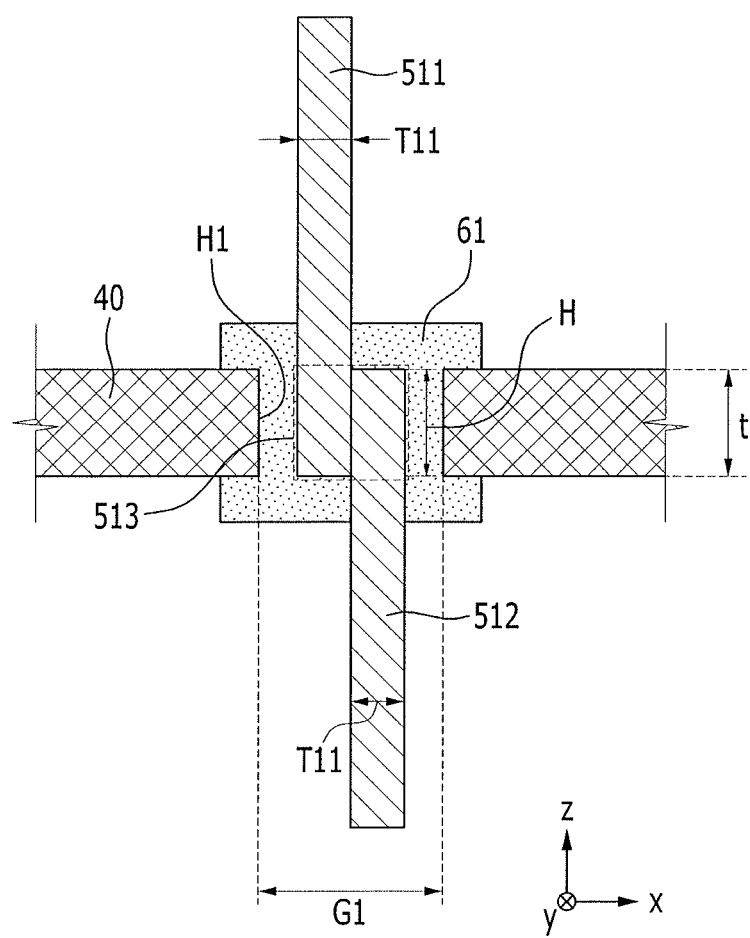
FIG. 6 illustrates a cross-sectional view of a terminal hole of a cap plate of FIG. 3 into which an electrode terminal is insert-molded.

FIG. 6 illustrates a cross-sectional view of a terminal hole of a cap plate of FIG. 3 into which an electrode terminal is insert-molded. Referring to FIG. 2, FIG. 3, FIG. 5, and FIG. 6, the electrode terminals 51 and 52 may have a same structure. For example, the electrode terminals 51 and 52 respectively include external terminal portions 511 and 521, internal terminal portions 512 and 522, and connectors 513 and 523.

The external terminal portions 511 and 521 protrude outside of the cap plate 40 and the internal terminal portions 512 and 522 protrude inside the cap plate 40, to be connected to the uncoated tabs 112 and 122. The connectors 513 and 523 respectively connect the external terminal portions 511 and 521 and the internal terminal portions 512 and 522, and are disposed inside the terminal holes H1 and H2 to be covered with the molding resin materials 61 and 62, thereby being electrically insulated from the terminal holes H1 and H2.

For example, the internal terminal portions 512 and 522 and the uncoated tabs 112 and 122 may be connected by ultrasonic welding, and the connectors 513 and 523 may be connected thereto by ultrasonic welding or laser welding. The connecting portions 513 and 523 have a height H set in the terminal holes H1 and H2, and the height H is in a range of a thickness t of the cap plate 40 forming the terminal holes H1 and H2.

That is, the height H may be less than or equal to a thickness t (H≤t). Accordingly, the connectors 513 and 523 are stably insulated by the molding resin materials 61 and 62 inside the terminal holes H1 and H2 of the cap plate 40, and are not protruded to an outer surface or an inner surface of the cap plate 40.

For convenience, one terminal hole H1 will be described as an example. The terminal hole H1 is formed to have a first gap G1 in the width direction (x-axis direction) of the cap plate 40 to be spaced apart from the electrode terminal 51, and is formed to have a second gap G2 in a longitudinal direction (y-axis direction) that intersects the width direction to be spaced apart from the electrode terminal 51. The second gap G2 in the y-axis direction is larger than the first gap G1 in the x-axis direction.

The electrode terminal 51 has a thickness t11 that is smaller than the first gap G1 in the width direction (x-axis direction) and has a width W11 that is smaller than the second gap G2 and larger than the thickness t11 in the longitudinal direction (y-axis direction), to extend in a z-axis direction. Therefore, the electrode terminal 51 having the thickness t11 and the width W11 and forming the plane (yz plane) in a height direction (z-axis direction) may be installed in the terminal hole H1 by the insert molding method.

Referring to FIG. 2 and FIG. 5, the external terminal portions 511 and 521 and the internal terminal portions 512 and 522 may be formed of a same material or different materials in the electrode terminals 51 and 52. For example, the internal terminal portion 512 connected to the uncoated tabs 112 of the negative electrode 11 formed of copper (Cu) may be formed of copper (Cu), and the external terminal portion 511 may be formed of aluminum (Al).

The internal terminal portions 512 formed of copper (Cu) can improve weldability with the uncoated tabs 112 formed of copper (Cu), which are made of the same material. In addition, when a module is formed, the external terminal portions 511 made of aluminum (Al) may be connected in parallel or in series with the external terminal portions 511 and 521 (made of the same material of aluminum (Al)) of different electrode terminals 51 and 52 of different cells, thereby improving the weldability.

One terminal hole H1 in the first exemplary embodiment will be described as an example. In the electrode terminal 51, the external terminal portion 511 and the internal terminal portion 512 are separately formed, and the connector 513 is formed by stacking and welding the external terminal portion 511 and the internal terminal portion 512 in the width direction (x-axis direction).

The external terminal portion 511 and the internal terminal portion 512 have the same width W11 in the longitudinal direction (y-axis direction). The external terminal portion 511 and the internal terminal portion 512 have the same thickness t11 in the width direction (x-axis direction). Accordingly, the connector 523 is formed to have a total thickness (2*t11) of the external terminal portion 511 and the internal terminal portion 512 in the width direction (x-axis direction).

The molding resin material 61 seals the external terminal portion 511 and outer end portions of the internal terminal portion 512 outside of the terminal hole H1, and seals the internal terminal portion 512 and inner end portion of the external terminal portions 511 inside of the terminal hole H1.

As such, a structure of the electrode terminal 51 and constituent elements are simplified around the terminal hole H1 by connecting the internal terminal portion 512 and the external terminal portion 511 to each other by the connector 513 to protrude to the outside of the cap plate 40 and insulating the connector 513 with the molding resin material 61.

Therefore, the weight and manufacturing cost of the rechargeable battery 100 may be reduced. Further, a connection distance between the electrode assembly 10 and the electrode terminal 51 is shortened to reduce resistance. The rechargeable battery 100 also enables charging and discharging of a high current thanks to low resistance.

The connector 513 of the total thickness (2*t11) may be attached to the molding resin material 61 filled in the terminal hole H1 in a large area to provide strong resistance against an impact and an external force which may act on the external terminal portion 511 in the longitudinal direction (z-axis direction) of the electrode terminal 51. Therefore, the electrode terminal 51 may maintain a solid installation state in the terminal hole H1 of the cap plate 40.

Figure 7:
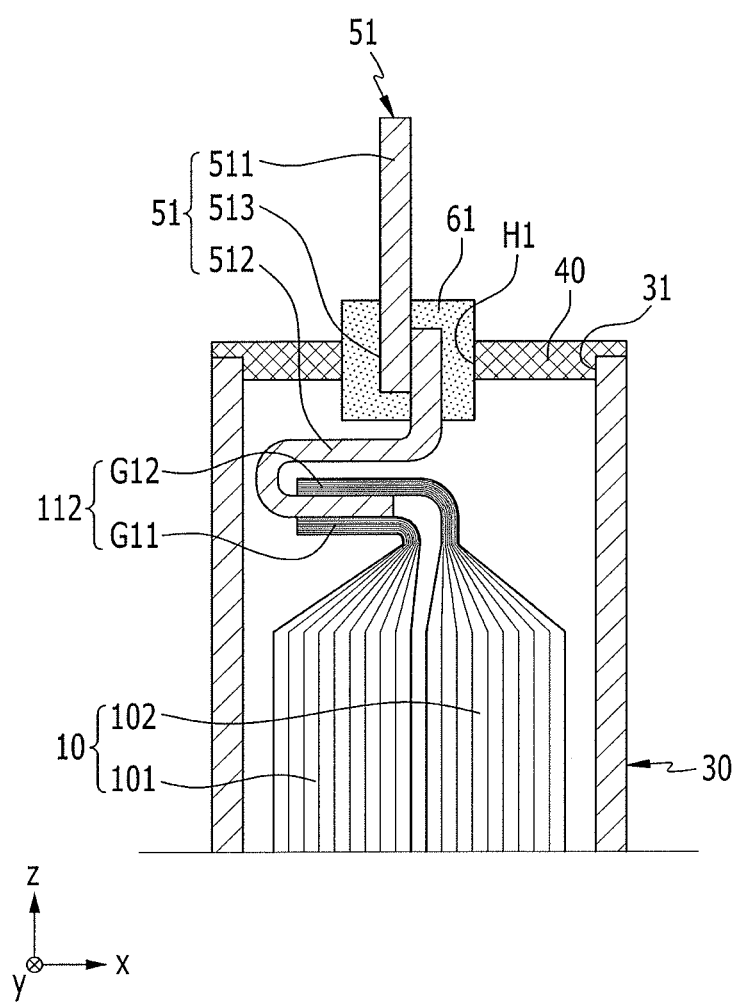
FIG. 7 illustrates a cross-sectional view of the insert-molded electrode terminal of FIG. 6 which is connected to an electrode assembly.

FIG. 7 illustrates a cross-sectional view of the insert-molded electrode terminal of FIG. 6 which is connected to an electrode assembly. Referring to FIG. 7, the rechargeable battery 100 may be assembled by connecting the electrode assembly 10 to the electrode terminal 51, and then accommodating the electrode assembly 10 in the case 30 and bending the electrode terminal 51 and the uncoated tabs 112 to couple the cap plate 40 to the opening 31.

In this case, the space between the inner surface of the cap plate 40 and the electrode assembly 10 is reduced because the internal terminal portions 512 and the uncoated tabs 112 are bent. Therefore, the cell height of the rechargeable battery 100 may be reduced, and the space utilization rate may be improved.

Hereinafter, various exemplary embodiments of the present invention will be described. For the sake of convenience, same constituent elements will be omitted and different constituent elements will be described in comparison with the first embodiment and the previously described embodiments.

Figure 8:
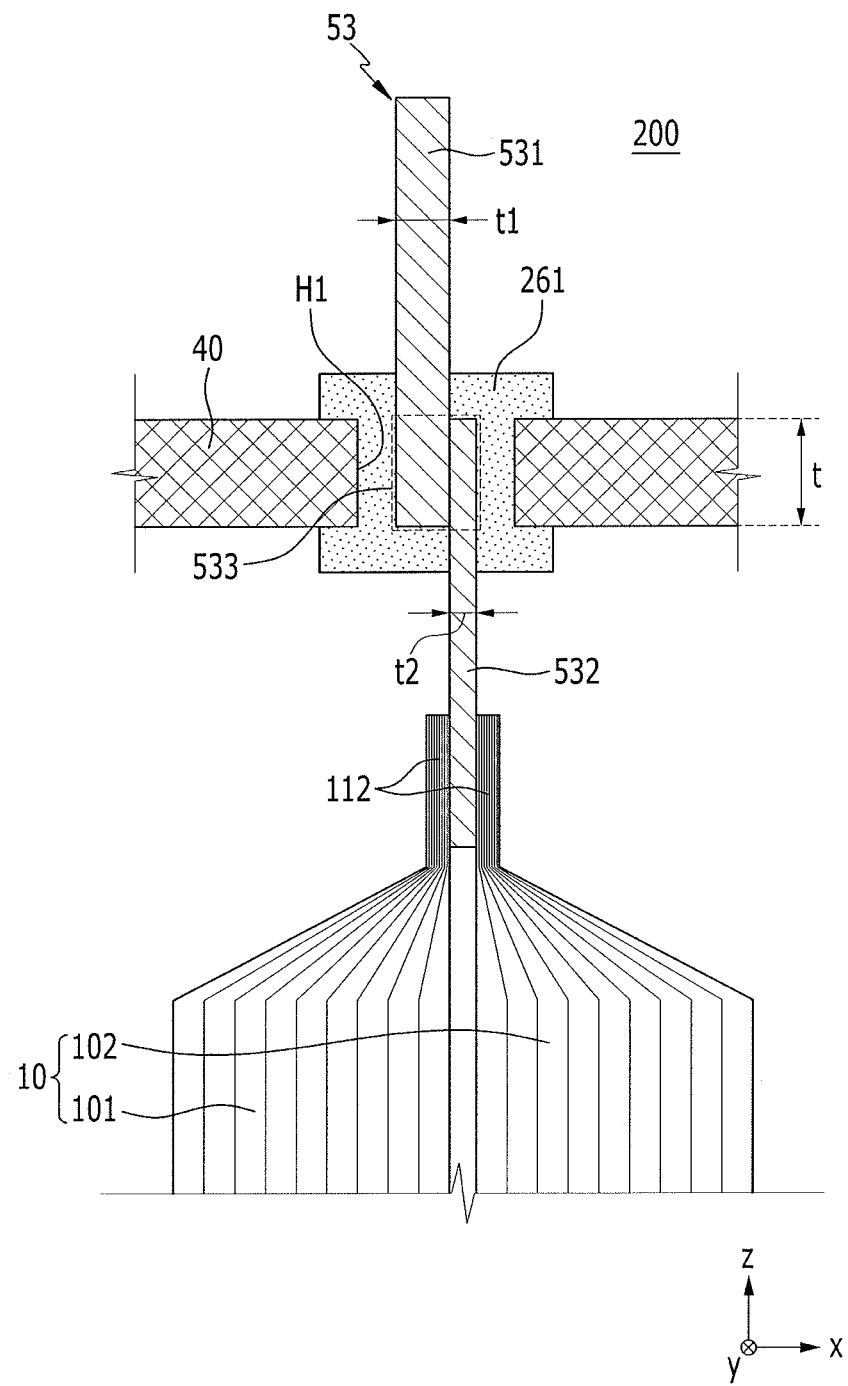
FIG. 8 illustrates a cross-sectional view of a rechargeable battery in which an electrode terminal is insert-molded into a terminal hole of a cap plate according to a second exemplary embodiment of the present invention.

FIG. 8 illustrates a cross-sectional view of a rechargeable battery in which an electrode terminal is insert-molded into a terminal hole of a cap plate according to a second exemplary embodiment of the present invention. Referring to FIG. 8, in the electrode terminal 53 of the rechargeable battery 200 according to the second exemplary embodiment, an external terminal portion 531 and an internal terminal portion 532 are separately formed, and a connector 533 is formed by stacking and welding the external terminal portion 531 and the internal terminal portion 532 in the width direction (x-axis direction).

The external terminal portion 531 has a first thickness t1 in the width direction (x-axis direction), and the internal terminal portion 532 has a second thickness t2 that is thinner than the first thickness t1 in the width direction. The connector 533 is formed of a total thickness (t1+t2) of the first thickness t1 of the external terminal portion 531 and the second thickness t2 of the internal terminal portion 532 in the width direction (x-axis direction).

The internal terminal portion 532 of the second thin thickness t2 which is thin enables a stable welding connection with the uncoated tabs 112 of the electrode assembly 10. When a module is formed, the external terminal portion 531 of the first thickness t1 which is thick may be connected in parallel or in series with external terminal portions of different electrode terminals of different cells, thereby improving the weldability.

A molding resin material 261 seals the outer end portion of the external terminal portion 531 and the internal terminal portion 532 outside of the terminal hole H1, and seals the inner end portion of the external terminal portion 531 and the internal terminal portion 532 inside of the terminal hole H1.

The connector 533 of the total thickness (t1+t2) may be attached to the molding resin material 261 filled in the terminal hole H1 in a large area to provide strong resistance against an impact and an external force which may act on the external terminal portion 531 in the longitudinal direction (z-axis direction) of an electrode terminal 53.

Figure 9:
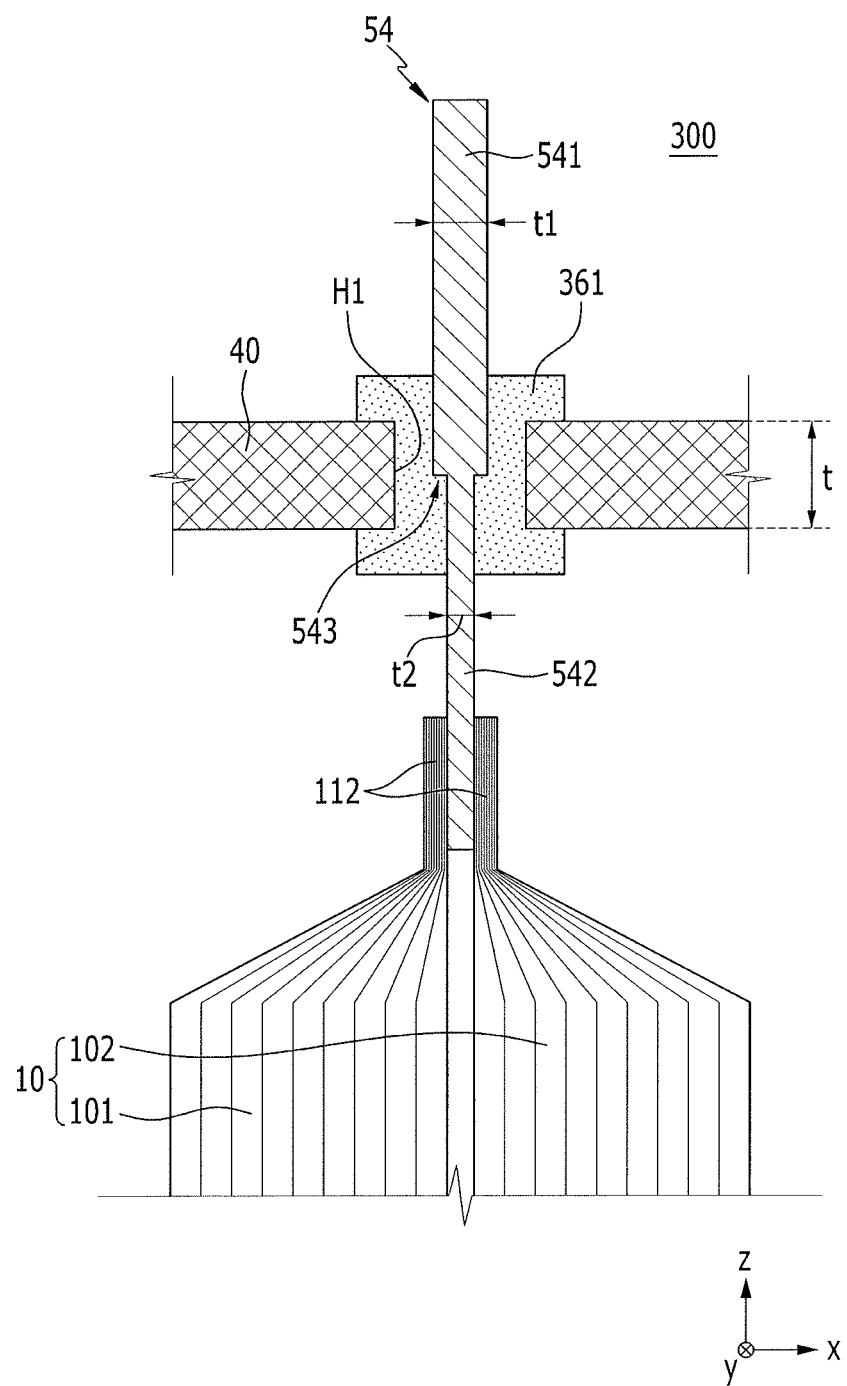
FIG. 9 illustrates a cross-sectional view of a rechargeable battery in which an electrode terminal is insert-molded into a terminal hole of a cap plate according to a third exemplary embodiment of the present invention.

FIG. 9 illustrates a cross-sectional view of a rechargeable battery in which an electrode terminal is insert-molded into a terminal hole of a cap plate according to a third exemplary embodiment of the present invention. Referring to FIG. 9, an external terminal portion 541 and an internal terminal portion 542 are integrally formed in an electrode terminal 54 of the rechargeable battery 300 according to the third exemplary embodiment.

A connector 543 forms a step by a first thickness t1 of the external terminal portion 541 and a second thickness t2 of the internal terminal portion 542 in the width direction (x-axis direction), to extend in the height direction intersecting with a plane of the cap plate 40.

The internal terminal portion 542 of the second thin thickness t2 which is thin enables a stable welding connection with the uncoated tabs 112. When a module is formed, the external terminal portion 541 of the first thickness t1 which is thick may be connected in parallel or in series with external terminal portions of different electrode terminals of different cells, thereby improving the weldability.

A molding resin material 361 seals the external terminal portion 541 on the outside of the terminal hole H1, seals the internal terminal portion 542 on the inside of the terminal hole H1, and seals the connector 543 and the step within a thickness range of the cap plate 40.

The connector 543 having the step may be attached to the molding resin material 361 filled in the terminal hole H1 in a large area to provide strong resistance against an impact and an external force which may act on the external terminal portion 541 in the longitudinal direction (z-axis direction) of the electrode terminal 54.

Figure 10:
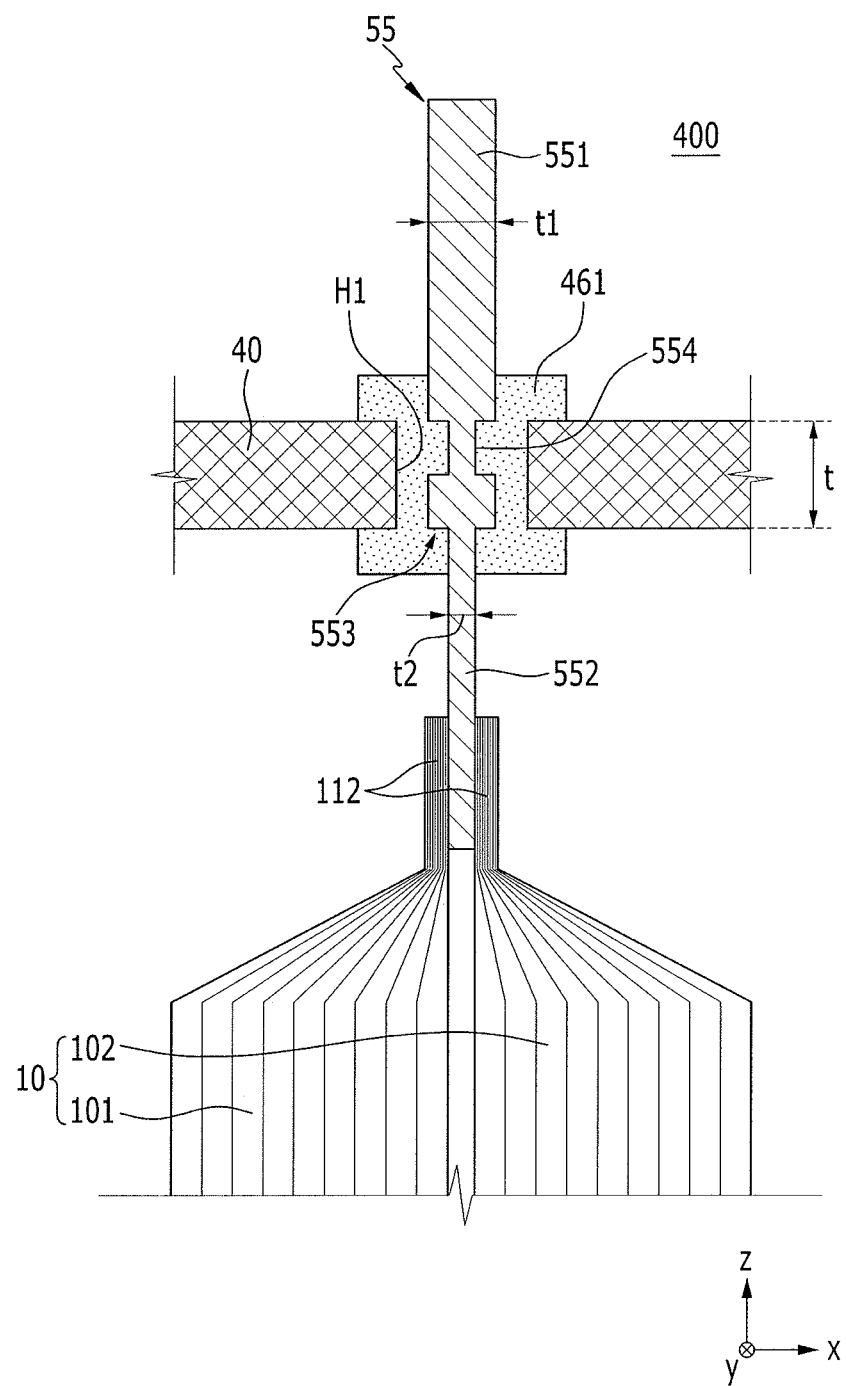
FIG. 10 illustrates a cross-sectional view of a rechargeable battery in which an electrode terminal is insert-molded into a terminal hole of a cap plate according to a fourth exemplary embodiment of the present invention.

FIG. 10 illustrates a cross-sectional view of a rechargeable battery in which an electrode terminal is insert-molded into a terminal hole of a cap plate according to a fourth exemplary embodiment of the present invention. Referring to FIG. 10, an external terminal portion 551 and an internal terminal portion 552 are integrally formed in an electrode terminal 55 of the rechargeable battery 400 according to the fourth exemplary embodiment. A connector 553 further defines a concave groove 554 at an upper portion of the step.

Specifically, the connector 553 forms a step by a first thickness t1 of the external terminal portion 551 and a second thickness t2 of the internal terminal portion 552 in the width direction (x-axis direction), to extend in the height direction intersecting with a plane of the cap plate 40. The concave groove 554 is formed between the external terminal portion 551 and the step.

The internal terminal portion 552 of the second thin thickness t2 which is thin enables a stable welding connection with the uncoated tabs 112. When a module is formed, the external terminal portion 551 of the first thickness t1 which is thick may be connected in parallel or in series with external terminal portions of different electrode terminals of different cells, thereby improving the weldability.

A molding resin material 461 seals the external terminal portion 551 on the outside of the terminal hole H1, seals the internal terminal portion 552 on the inside of the terminal hole H1, and seals the connector 553, the concave groove 554, and the step within a thickness range of the cap plate 40.

The connector 553 having the concave groove 554 and the step may be attached to the molding resin material 461 filled in the terminal hole H1 in a larger area to provide stronger resistance against an impact and an external force which may act on the external terminal portion 551 in the longitudinal direction (z-axis direction) of the electrode terminal 55.

Figure 11:
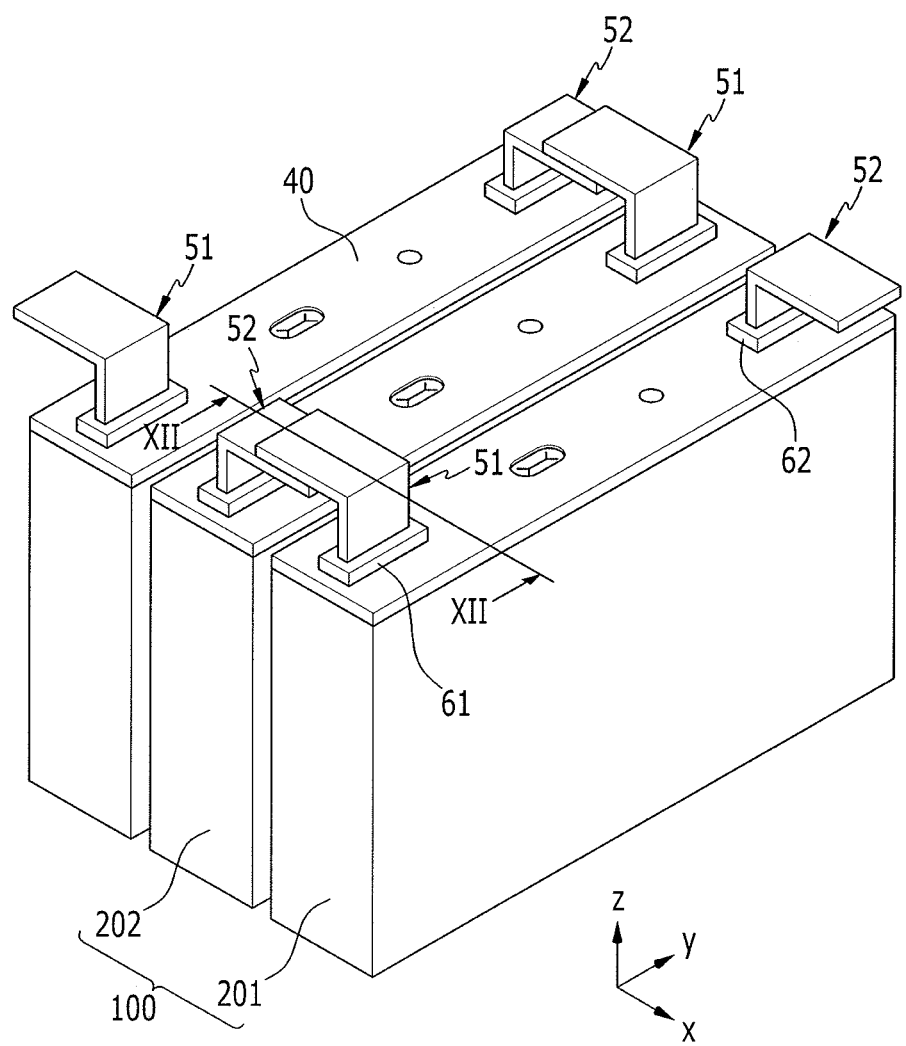
FIG. 11 illustrates a perspective view of a rechargeable battery module according to an exemplary embodiment of the present invention.
Figure 12:
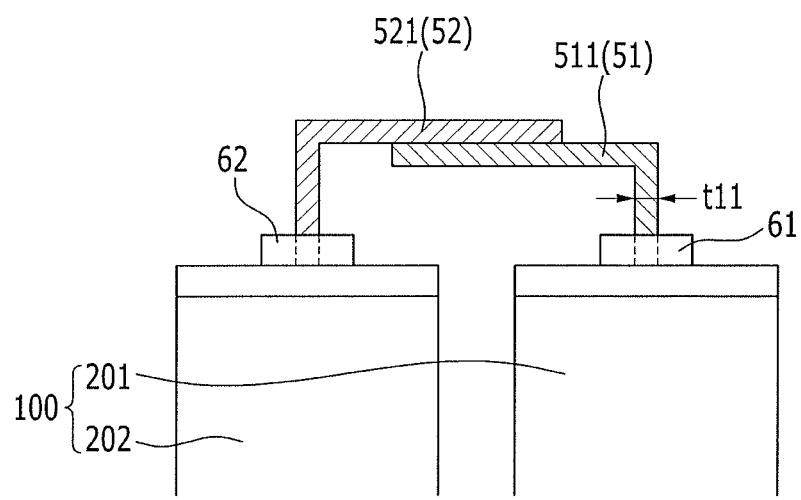
FIG. 12 illustrates a cross-sectional view taken along a line XII-XII of FIG. 11.

FIG. 11 illustrates a perspective view of a rechargeable battery module according to an exemplary embodiment of the present invention, and FIG. 12 illustrates a cross-sectional view taken along a line XII-XII of FIG. 11. Hereinafter, a rechargeable battery module will be described with reference to FIG. 11 and FIG. 12. For convenience, the rechargeable battery 100 of the first embodiment is applied to unit cells.

The rechargeable battery module of the present exemplary embodiment includes at least a first cell 201 and a second cell 202 disposed in the width direction (x-axis direction) of the cap plate 40. An external terminal portion 511 of the first cell 201 is laterally bent toward the second cell 202, and an external terminal portion 521 of the second cell 202 is bent toward an upper side of the external terminal portion 511 of the first cell 201, to be welded to each other.

The external terminal portion 511 of the first cell 201 and the external terminal portion 521 of the second cell 202 form a thickness t11 that is smaller than a first gap G1 in the width direction (x-axis direction) and a width W11 that is larger than the thickness t11 while being smaller than a second gap G2 in the longitudinal direction (y-axis direction).

The rechargeable battery module of the present exemplary embodiment is formed by bending and welding the external terminal portions 511 and 521 of the first and second cells 201 and 202 to electrically connect the external terminal portions 511 and 521 to each other, and thus an additional bus bar for connecting the electrode terminals 51 and 52 is not required.

As such, since the bus bar is not used, the total height of the rechargeable battery module may be reduced. When the external terminal portions 511 and 521 are made of a same material (e.g., Al), the weldability between the electrode terminals 51 and 52 may be improved.

While this invention has been described in connection with what is presently considered to be practical exemplary

DESCRIPTION OF SYMBOLS

10: electrode assembly
11: first electrode (negative electrode)
12: second electrode (positive electrode)
13: separator
31: opening
41: vent hole
51, 52, 53, 54, 55: electrode terminal
61, 62, 261, 361, 461: molding resin material
100, 200, 300, 400: rechargeable battery
101, 102: first, second assembly
112, 122: uncoated tab
411: vent plate
421: sealing stopper
511, 521, 531, 541, 551: external terminal portion
554: concave groove
512, 522, 532, 542, 552: internal terminal portion
D: distance
G1, G2: first, second gap
G12, G22: second tab group
H1, H2: terminal hole
t1: first thickness
W: winding range
30: case
40: cap plate
42: electrolyte injection opening
111, 121: coated region
201, 202: first, second cell
412: notch
513, 523, 533, 543, 553: connector
G11, G21: first tab group
H: height
t, t11: thickness
t2: second thickness
W11: width

The invention claimed is:

1. A rechargeable battery comprising:
an electrode assembly including an electrode having coated regions and uncoated tabs at opposite sides of a separator;
a case configured to accommodate the electrode assembly therein;
a cap plate coupled to an opening of the case;
electrode terminals insert-molded into terminal holes of the cap plate, respectively, to be connected to the uncoated tabs, the electrode terminals being spaced apart from each other along a first direction parallel to a bottom of the case, and each of the electrode terminals including:
an external terminal portion configured to protrude outside of the cap plate;
an internal terminal portion parallel to the external terminal portion and connected to the uncoated tabs within the case; and
a connector in a respective one of the terminal holes and configured to connect the external terminal portion and the internal terminal portion, a width of the internal terminal portion being smaller than a width of the connector in the respective one of the terminal holes in a second direction perpendicular to the first direction and parallel to the bottom of the case; and
a molding resin material surrounding the connector in the respective one of the terminal holes, the molding resin material extending into the case to cover portions of an internal surface of the cap plate and of a sidewall of the internal terminal portion below the cap plate, the molding resin material covering and being in direct contact with a bottommost surface of the external terminal portion, the bottommost surface of the external terminal portion being parallel to the first direction and within the respective one of the terminal holes.

2. The rechargeable battery as claimed in claim 1, wherein the respective one of the terminal holes includes:
a first gap in the second direction, and
a second gap that is larger than the first gap in the first direction, the second gap being larger than each of the electrode terminals in the first direction.

3. The rechargeable battery as claimed in claim 2, wherein each of the electrode terminals has a first width that is smaller than the first gap in the second direction, and has a second width that is smaller than the second gap and larger than the first width in the first direction.

4. The rechargeable battery as claimed in claim 1, wherein:
the external terminal portion and the internal terminal portion are separately formed, and
the connector is formed by stacking and welding the external terminal portion and the internal terminal portion in the second direction.

5. The rechargeable battery as claimed in claim 4, wherein a width of the external terminal portion in the first direction equals a width of the internal terminal portion in the first direction.

6. The rechargeable battery as claimed in claim 4, wherein a width of the external terminal portion in the second direction equals the width of the internal terminal portion in the second direction.

7. The rechargeable battery as claimed in claim 6, wherein the width of the connector in the second direction equals a sum of the widths of the external terminal portion and the internal terminal portion in the second direction.

8. The rechargeable battery as claimed in claim 6, wherein the molding resin material seals outer end portions of the external terminal portion and the internal terminal portion outside of the respective one of the terminal holes, and seals inner end portions of the external terminal portion and the internal terminal portion inside of the respective one of the terminal holes.

9. The rechargeable battery as claimed in claim 4, wherein a width of the external terminal portion in the second direction is larger than the width of the internal terminal portion in the second direction.

10. The rechargeable battery as claimed in claim 9, wherein the width of the connector in the second direction equals a sum of the widths of the external terminal portion and the internal terminal portion in the second direction.

11. The rechargeable battery as claimed in claim 1, wherein:
the external terminal portion and the internal terminal portion are integrally formed to be aligned along a same vertical axis, a width of the external terminal portion in the second direction being larger than the width of the internal terminal portion in the second direction, and
the connector forms a step between the external terminal portion and the internal terminal portion, to extend in a height direction intersecting with a plane of the cap plate.

12. The rechargeable battery as claimed in claim 11, wherein the molding resin material seals the external terminal portion outside the respective one of the terminal holes, seals the internal terminal portion inside the respective one of the terminal holes, and seals the step within a thickness range of the cap plate.

13. The rechargeable battery as claimed in claim 12, wherein the connector further includes a concave groove at an upper portion of the step.

14. The rechargeable battery as claimed in claim 13, wherein the molding resin material further seals the concave groove within the thickness range of the cap plate.

15. The rechargeable battery as claimed in claim 1, wherein the external terminal portion and the internal terminal portion partially overlap each other in the second direction within the respective one of the terminal holes to define the connector, a thickness of the overlap along a direction perpendicular to the bottom of the case being equal to or smaller than a thickness of the respective one of the terminal holes.

16. The rechargeable battery as claimed in claim 1, wherein the external terminal portion and the internal terminal portion are in direct surface contact with each other within the connector.

* * * * *